US012597140B2

(12) United States Patent
    Li et al.

(10) Patent No.: US 12,597,140 B2
(45) Date of Patent: Apr. 7, 2026

(54) METHOD, SYSTEM AND DEVICE OF IMAGE SEGMENTATION

(71) Applicant: SHANGHAI UNITED IMAGING HEALTHCARE CO., LTD., Shanghai (CN)

(72) Inventors: Yang Li, Shanghai (CN); Chao-Ran Liu, Shanghai (CN); Wen-Hui Fang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 486 days.

(21) Appl. No.: 18/119,840

(22) Filed: Mar. 10, 2023

(65) Prior Publication Data

US 2023/0289969 A1     Sep. 14, 2023

(30) Foreign Application Priority Data

Mar. 10, 2022    (CN) .......................... 202210235393.9

(51) Int. Cl.
    *G06K 9/00*      (2022.01)
    *G06T 7/10*      (2017.01)
    *G06T 7/30*      (2017.01)

(52) U.S. Cl.
    CPC ................. *G06T 7/10* (2017.01); *G06T 7/30* (2017.01); *G06T 2207/20016* (2013.01); *G06T 2207/20084* (2013.01); *G06T 2207/20221* (2013.01)

(58) Field of Classification Search
    CPC ............. G06T 7/30; G06T 2207/20084; G06T 2207/10081
    See application file for complete search history.

(56) References Cited

U.S. PATENT DOCUMENTS

| | | | |
|---|---|---|---|
| 2019/0205606 A1* | 7/2019 | Zhou ..................... | G06F 18/285 |
| 2023/0046321 A1* | 2/2023 | Vilsmeier .............. | G06V 10/26 |

FOREIGN PATENT DOCUMENTS

| | | |
|---|---|---|
| CN | 112150485 A | 12/2020 |
| CN | 112418041 A | 2/2021 |
| CN | 112419338 A | 2/2021 |
| CN | 114038004 A | 2/2022 |
| WO | 2020028352 A1 | 2/2020 |

OTHER PUBLICATIONS

Chinese Office Action (CN Application No. 2022102353939) , dated Feb. 10, May, 8 pages.

* cited by examiner

*Primary Examiner* — Molly Wilburn
*Assistant Examiner* — Aidan Keup

(57)          ABSTRACT

A method of image segmentation, including: acquiring image information, the image information including an image to be segmented, a template, and a segmentation mask; and obtaining a segmentation result of the image to be segmented based on the image information by an image segmentation mode. The image segmentation model includes an image transforming network and a segmenting network.

18 Claims, 8 Drawing Sheets moving images and partitions
510 reference image
520 averaging 540 solving
probability 550 registered result and partitions
530 template
560

<u>200</u>

<u>300</u>

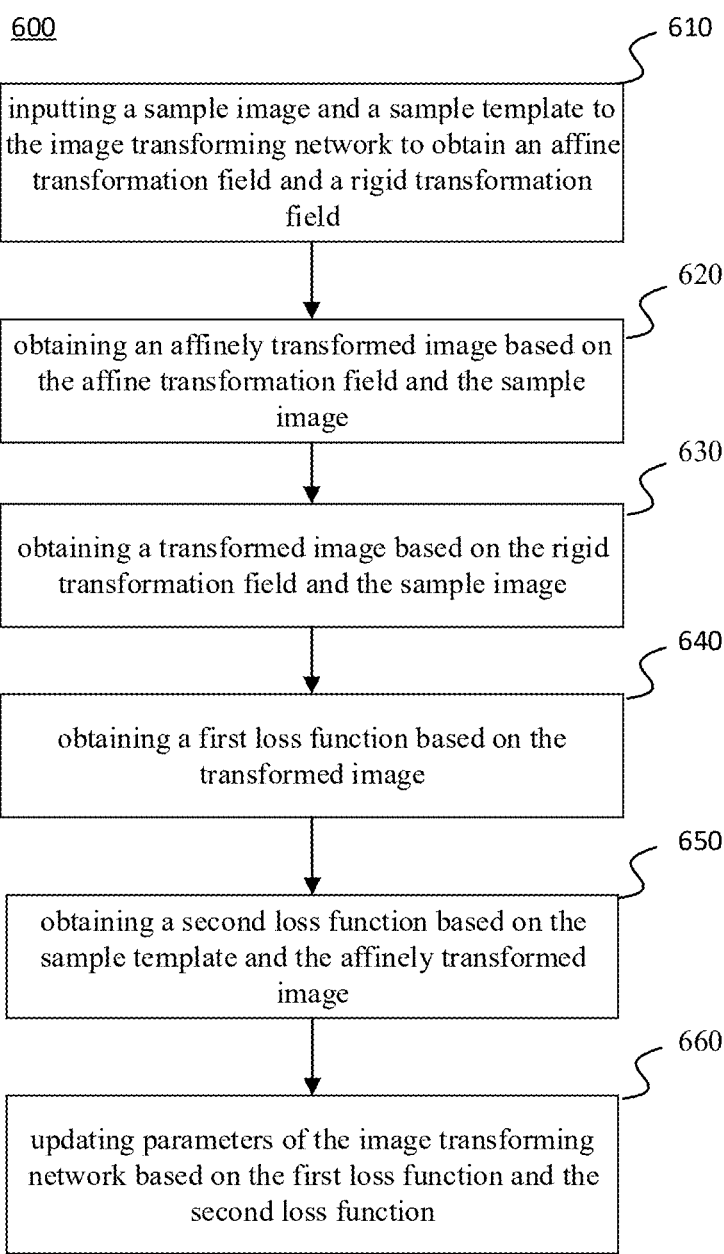

600

610 inputting a sample image and a sample template to the image transforming network to obtain an affine transformation field and a rigid transformation field

620 obtaining an affinely transformed image based on the affine transformation field and the sample image

630 obtaining a transformed image based on the rigid transformation field and the sample image

640 obtaining a first loss function based on the transformed image

650 obtaining a second loss function based on the sample template and the affinely transformed image

660 updating parameters of the image transforming network based on the first loss function and the second loss function

FIG. 6

METHOD, SYSTEM AND DEVICE OF IMAGE SEGMENTATION

CROSS-REFERENCE TO RELATED APPLICATION

The present application claims the priority of Chinese Patent Application No. 202210235393.9, filed on Mar. 10, 2022, entitled "Method, System and Device of Image Segmentation, and Storage Medium", which is hereby incorporated by reference in its entirety.

TECHNICAL FIELD

The present disclosure relates to the field of medical technology, and more particularly, to a method and a system of image segmentation.

BACKGROUND

With the rapid development of medical images, imaging techniques (including Computed Tomography (CT), Magnetic Resonance Imaging (MRI), Positron Emission Tomography (PET) imaging, etc.) have become an indispensable means for disease diagnosis, surgical protocol planning, and prognosis evaluation. Medical image processing may improve diagnostic efficiency, and image segmentation is an important part of medical image processing.

SUMMARY

One of the embodiments of the present disclosure provides a method of image segmentation. The method of image segmentation includes acquiring image information, the image information including an image to be segmented, a template, and a segmentation mask, and obtaining a segmentation result of the image to be segmented based on the image information by an image segmentation model. The image segmentation model includes an image transforming network and a segmenting network.

In one of the embodiments, prior to the obtaining the segmentation result of the image to be segmented based on the image information by the image segmentation model, the method further includes training the image segmentation model, and the training the image segmentation model includes: acquiring sample image information, the sample image information including a sample image, a sample template, and a sample segmentation mask; and training the image segmentation model based on the sample image information.

One of the embodiments of the present disclosure provides a system of image segmentation, including: an image information acquiring module, configured to acquire image information, the image information including an image to be segmented, a template, and a segmentation mask of the template; and an image segmentation module, configured to obtain a segmentation result of the image to be segmented based on the image information by an image segmentation model, and the image segmentation model including an image transforming network and a segmenting network.

One of the embodiments of the present disclosure provides a device of image segmentation, including a processor and a memory. A computer program is stored in the memory, and when executing the computer program, the processor performs the method of image segmentation.

One of the embodiments of the present disclosure provides a non-transitory computer-readable storage medium.

Computer instructions are stored in the storage medium, and when reading the computer instructions in the storage medium, the computer performs the method of image segmentation.

BRIEF DESCRIPTION OF THE DRAWINGS

In order to illustrate the technical solutions of the embodiments of the present disclosure more clearly, a brief description of the drawings required for the description of the embodiments will be provided hereinafter. Obviously, the drawings in the following description are merely some examples or embodiments of the present disclosure, and according to these drawings, the ordinary skill in the art may apply the present disclosure to other similar scenarios without involving any inventive efforts. The identical reference numeral in the drawings represents the same structure or the same operation unless apparent from the language environment or otherwise indicated.

FIG. 6 is an exemplary flow chart of a method for training an image segmentation model according to some embodiments of the present disclosure;

DETAILED DESCRIPTION OF THE EMBODIMENTS

Figure 1:
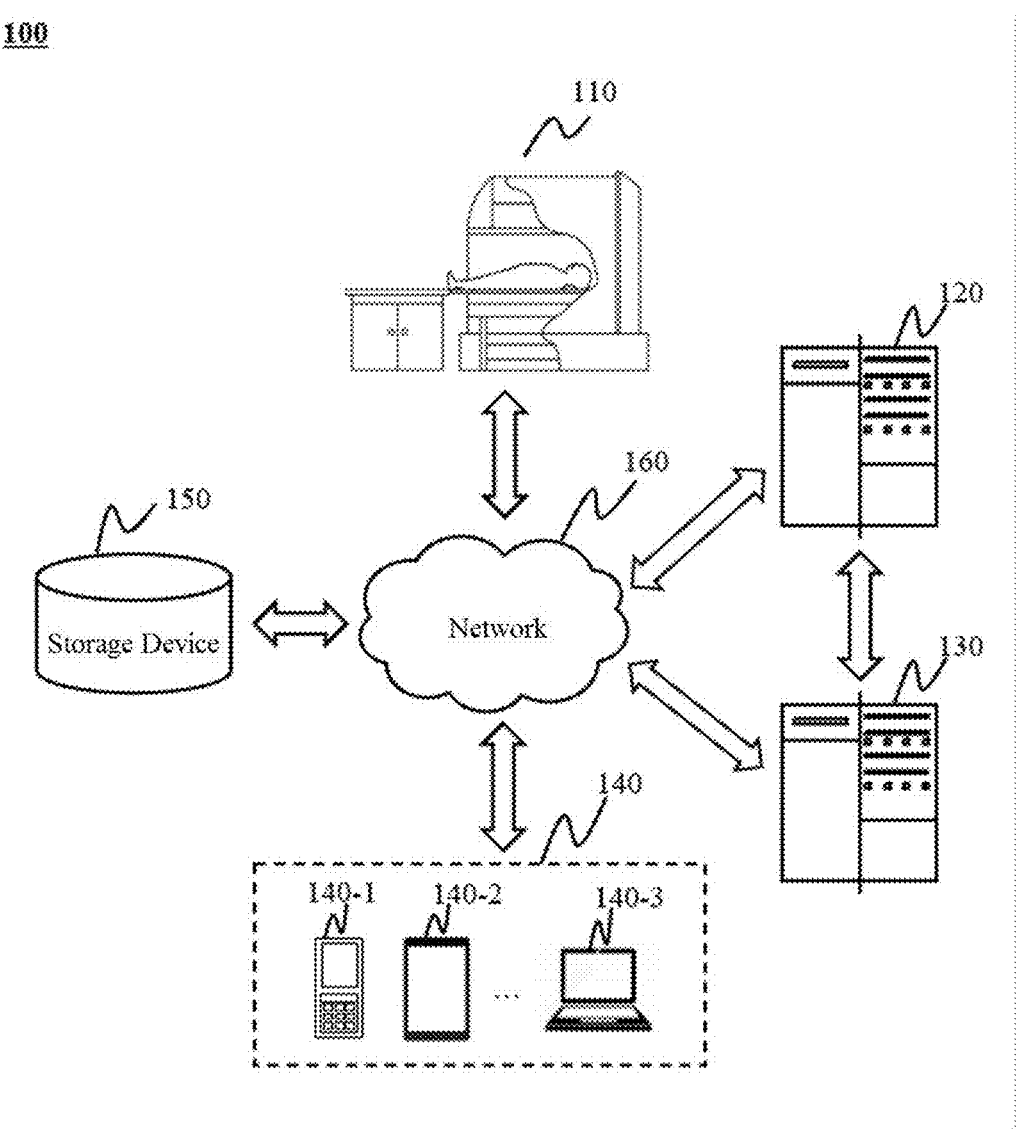
FIG. 1 is a schematic view showing an application scenario of a system of image segmentation according to some embodiments of the present disclosure.

The present disclosure will be further illustrated by way of exemplary embodiments, which will be described in detail with reference to the accompanying drawings. These embodiments are not restrictive, and in these embodiments, the identical numeral denotes the same structure.

It should be understood that "system", "means", "unit", and/or "module", as used herein, are used for distinguishing components, elements, parts, or assemblies of different levels. However, if other words may achieve the same purpose, these terms may be replaced by other expressions.

As described in the specification and claims, unless the context explicitly indicates the exception, the terms such as "a", "an", "a kind" and/or "the" are not specifically singular, but also include plural. In general, the terms "include" and "contain" are intended to include only those steps and elements that have been explicitly identified, and such steps and elements do not constitute an exclusive listing, the method, or the device may also include other steps or elements.

The flow chart is used in the present disclosure to illustrate the operations performed by the system according to the embodiments of the present disclosure. It should be understood that the preceding or following operations are not necessarily performed precisely in the order. Instead, the steps may be processed in a reverse order or processed simultaneously. Moreover, other operations may also be added to or removed from these procedures.

In some application scenarios, the system of image segmentation may include a computing device and a user terminal. The system of image segmentation may implement the method and/or procedure disclosed in the present disclosure through the computing device, or the like, to implement the image segmentation for the image and send a segmentation result to the user terminal, so that the user may diagnose and treat a patient according to the segmentation result, thereby reducing the workload of the image segmentation, reducing the processing difficulty, improving the quality of the image segmentation, and facilitating an accurate diagnosis and treatment for the patient.

In the related art, deep learning-based segmentation methods may be used for certain regions in an image with inconspicuous structural tissues, such as, the Alberta Stroke Program Early CT Score (ASPECTS) among the ischemic stroke, or used for certain regions of artificially defined partitions. But such methods besides needing to label a large number of samples, may cause confusion in learning when structural information is insufficient. In view of such a problem, a method registering image with a template image may be configured to achieve segmentation of regions of images with inconspicuous structural tissues or segmentation of regions of artificially defined partitions. But this method needs a long running time and merely performs an information interaction between the image to be segmented and the template image. Accordingly, the present disclosure provides a method and a system of image segmentation.

As shown in FIG. 1, in some embodiments, a system 100 may include an imaging device 110, a first calculating device 120, a second calculating device 130, a user terminal 140, a storage device 150, and a network 160.

The imaging device 110 may refer to a device for reproducing a structure inside a target object (e.g., a human body) into an image by means of different media. In some embodiments, the imaging device 110 may be any device, such as CT, MRI, PET, etc., which may image or treat a designated body part of the target object (e.g., the human body). The imaging device 110 provided above is for purposes of illustration only but not intended to limit the scope thereof. In some embodiments, the imaging device 110 may acquire a medical image to be segmented of a patient and send the medical image to other components of the system 100 (e.g., the first calculating device 120, the second calculating device 130, and the storage device 150). In some embodiments, the imaging device 110 may exchange data and/or information with other components in the system 100 through the network 160.

The first calculating device 120 and the second calculating device 130 are systems with computing and processing capabilities, and may include various computers, such as servers, personal computers, or computing platforms composed of multiple computers connected via various configurations. In some embodiments, the first calculating device 120 and the second calculating device 130 may be implemented on a cloud platform. For example, the cloud platform may include one or a combination of more of private cloud, public cloud, hybrid cloud, community cloud, distributed cloud, cross-cloud, multi-cloud, and the like. In some embodiments, the first calculating device 120 and the second calculating device 130 may be the same device or different devices.

The first calculating device 120 and the second calculating device 130 may include one or more sub-processing devices (e.g., single-core processing devices or multi-core processing devices), and the sub-processing devices may execute program instructions. As an example only, the sub-processing devices may include various common central processing units (CPUs), Graphics Processing Units (GPUs), microprocessors, application-specific integrated circuits (ASICs), or other types of integrated circuits.

The first calculating device 120 may process information and data related to the image. In some embodiments, the first calculating device 120 may perform a method of image segmentation as described in some embodiments of the present disclosure, to obtain a segmentation result of an image to be segmented, e.g., an region segmentation result, etc. In some embodiments, the first calculating device 120 may include an image segmentation model, and the first calculating device 120 may obtain a segmentation result of the image to be segmented via the image segmentation model. In some embodiments, the first calculating device 120 may obtain a trained image segmentation model from the second calculating device 130. In some embodiments, the first calculating device 120 may perform the method of image segmentation described in some embodiments of the present disclosure, to obtain information such as a template and a segmentation mask. In some embodiments, the second calculating device 130 may acquire sample images, sample templates, sample segmentation masks, etc., which are used for training the image segmentation model. In some embodiments, the first calculating device 120 may exchange information and data with other components (e.g., the imaging device 110, the second calculating device 130, the user terminal 140, the storage device 150) in the system 100 through the network 160. In some embodiments, the first calculating device 120 may be directly connected to the second calculating device 130 and exchange information and/or data with the second calculating device 130.

The second calculating device 130 may be configured for training a model. In some embodiments, the second calculating device 130 may perform a method for training an image segmentation model described in some embodiments of the present disclosure, to obtain the image segmentation model. In some embodiments, the second calculating device 130 may obtain image information from the imaging device 110 to serve as the training data for the model. In some embodiments, information and data, such as the template, and the segmentation mask, etc., which are related to image segmentation and from the first calculating device 120, may be obtained by the second calculating device 130 and used for training and updating the model. In some embodiments, the first calculating device 120 and the second calculating device 130 may also be the same computing device.

The user terminal 140 may receive and/or show the segmentation result of the image. In some embodiments, the user terminal 140 may receive the segmentation result of the image from the first calculating device 120, and diagnose and treat the patient based on the segmentation result. In some embodiments, the user terminal 140 may instruct the first calculating device 120 to execute the method of image segmentation described in some embodiments of the present disclosure. In some embodiments, the user terminal 140 may control the imaging device 110 to acquire an image. In some embodiments, the user terminal 140 may be one or any combination of a mobile device 140-1, a tablet computer 140-2, a laptop computer 140-3, a desktop computer, and any other device having input and/or output functions.

The storage device 150 may store data or information generated by other devices. In some embodiments, the storage device 150 may store images acquired by the imaging device 110. In some embodiments, the storage device 150 may store data and/or information, such as the template, the segmentation mask of the template, the image segmentation result, the image segmentation model, etc., which are processed by the first calculating device 120 and/or by the second calculating device 130. The storage device 150 may include one or more storage components, each of which may be a separate device or may be part of another device. The storage device may be local or may be implemented by cloud.

The network 160 may connect various components of the system and/or connect the system and external resource components. The network 160 enables communications between components, as well as communications between the system and other components outside the system, to advance exchanges of data and/or information. In some embodiments, one or more components (e.g., the imaging device 110, the first calculating device 120, the second calculating device 130, the user terminal 140, and the storage device 150) in the system 100 may send data and/or information to other components through the network 160. In some embodiments, the network 160 may be any one or more of a wired network and a wireless network.

It should be noted that the description above is provided for the purposes of illustration only and is not intended to limit the scope of the present disclosure. Various changes and modifications may be made by those of ordinary skill in the art under the guidance of the present disclosure content. Features, structures, methods, and other features of the exemplary embodiments described in the present disclosure may be combined in various ways to obtain additional and/or alternative exemplary embodiments. For example, the first calculating device 120 and/or the second calculating device 130 may be based on the cloud computing platform, such as public cloud, private cloud, community cloud, hybrid cloud, and the like. However, these variations and modifications will not depart from the scope of the present disclosure.

Figure 2:
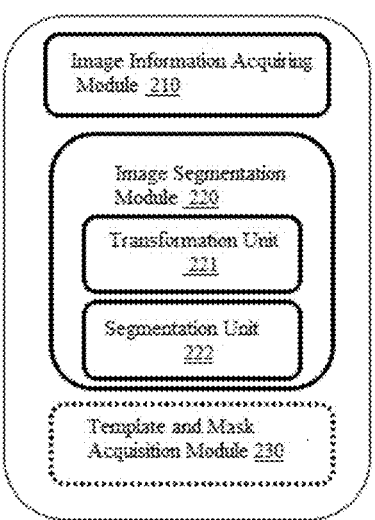
FIG. 2 is a schematic view showing a system of image segmentation according to some embodiments of the present disclosure.

FIG. 2 is a schematic view showing a system of image segmentation according to some embodiments of the present disclosure.

As shown in FIG. 2, in some embodiments, the system of image segmentation 200 may include an image information acquiring module 210 and an image segmentation module 220.

In some embodiments, the image information acquiring module 210 may be configured to acquire image information. The image information may include the image to be segmented, the template, the segmentation mask of the template, etc.

In some embodiments, the image segmentation module 220 may be configured to obtain the segmentation result of the image to be segmented based on the image information by the image segmentation model. The image segmentation model may include an image transforming network and a segmenting network. In some embodiments, the image segmentation model may be a machine learning model, e.g., a neural network model, etc. In some embodiments, the image segmentation model may consist of a cascade connection of the image transforming network and the segmenting network.

In some embodiments, the image segmentation module 220 may include a transformation unit 221 and/or a segmentation unit 222. The transformation unit 221 may be configured to obtain a transformed image based on the image to be segmented and the template by the image transforming network. The segmentation unit 222 may be configured to obtain the segmentation result based on the transformed image and a segmentation mask by the segmenting network. In some embodiments, the segmenting network may use a strategy of a fusion of transformation fields of multiple resolutions. In some embodiments, the segmentation unit 222 may be configured to obtain a transformation field based on the transformed image by the segmenting network, and obtain the segmentation result based on the transformation field and the segmentation mask by the segmenting network.

In some embodiments, the image to be segmented may include symmetry information, and the image segmentation model may be configured to obtain the segmentation result based on the symmetry information.

In some embodiments, the system 200 may also include a template and mask acquisition module 230. The template and mask acquisition module 230 may be configured to: acquire a plurality of moving images and corresponding partition masks; register the plurality of moving images with the standard space to acquire a plurality of registered images corresponding to the plurality of moving images; generate the template based on the plurality of registered images; map the partition masks corresponding to the plurality of moving images to the standard space based on a registration relationship of the plurality of moving images and the standard space, and obtain a mapped result; and/or obtain the segmentation mask based on the mapped result.

In some embodiments, the system 200 may also include a training module (not shown). The training module may be configured to acquire sample image information. The sample image information may include a sample image, a sample template, and a sample segmentation mask. The image segmentation model is trained based on the sample image information. The image segmentation model includes an image transforming network and a segmenting network.

In some embodiments, the training module training the image transforming network may include following steps. The sample image and the sample template are inputted to the image transforming network to obtain an affine transformation field and a rigid transformation field. An affinely transformed image is obtained based on the affine transformation field and the sample image. A transformed image is obtained based on the rigid transformation field and the sample image. A first loss function is obtained based on the transformed image. A second loss function is obtained based on the sample template and the affinely transformed image. Parameters of the image transforming network are updated based on the first loss function and the second loss function.

In some embodiments, the training module training the segmenting network may include following steps. The transformed image is inputted to the segmenting network to obtain transformation fields of multiple resolutions. The transformation fields of multiple resolutions are fused to obtain a fused transformation field. A transformed template and a transformed mask are obtained based on the sample template, the sample segmentation mask and the fused transformation field. A third loss function is obtained based on the transformed image and the transformed template. A fourth loss function is obtained based on the transformed mask and a mirror flip of the transformed mask. Parameters of the segmenting network are updated based on the third loss function and the fourth loss function.

In some embodiments, the image information acquiring module 210, the image segmentation module 220, and/or the template and mask acquisition module 230 may be configured on the first calculating device 120. In some embodiments, the training module may be configured on the second calculating device 130.

Figure 3:
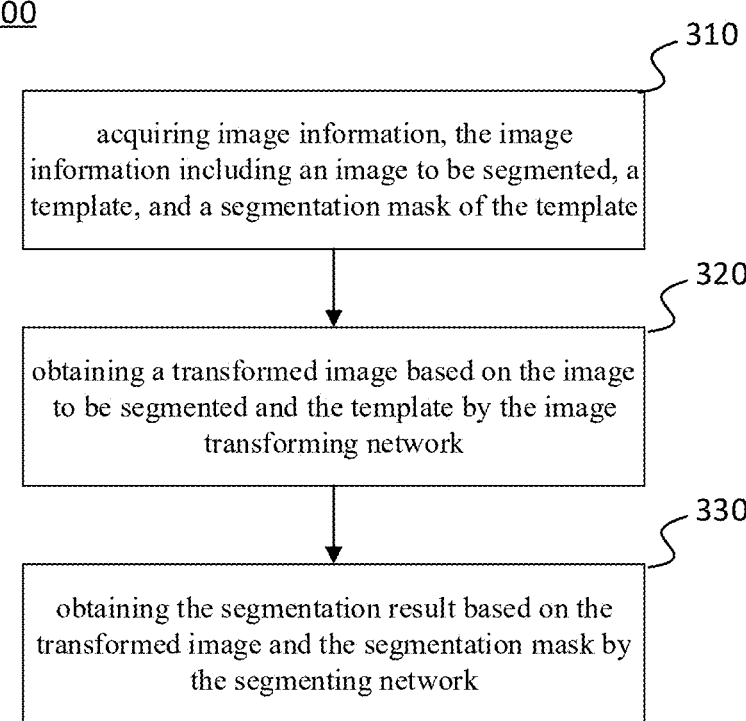
FIG. 3 is an exemplary flow chart of a method of image segmentation according to some embodiments of the present disclosure.

FIG. 3 is an exemplary flow chart of a method of image segmentation according to some embodiments of the present disclosure.

As shown in FIG. 3, a procedure 300 may include the following steps. In some embodiments, the procedure 300 may be performed by the first calculating device 120.

In step 310, image information is acquired. The image information may include an image to be segmented, a template, a segmentation mask of the template, etc. In some embodiments, the step 310 may be performed by the image information acquiring module 210.

The image to be segmented may be an image whose regions need to be segmented (e.g., a medical image, such as a brain image, a heart image, a prostate image, etc., whose regions need to be segmented for organs and/or tissues). In some embodiments, the image to be segmented may be an image having symmetry information (e.g., at least part of the organs and/or the tissues in the image have symmetry, such as multiple target regions in the ASPECTS among the ischemic stroke, supplying regions of a brain macrovascular blood, target regions of prostate scoring, etc.). In some embodiments, the image to be segmented may be acquired in a number of ways, such as by scanning through the imaging device 110, and reading from the storage device, etc.

The template, namely a template image, such as a brain template, a heart template, etc., refers to a standard image capable of presenting characteristics of a region of interest (e.g., characteristics of an organ/tissue) in an image. The template may be obtained by extracting common features from medical images of multiple identical or similar organs/tissues. In some embodiments, the template may be acquired based on a plurality of moving images and corresponding partition masks thereof.

The mask refers to a binary image configured to represent a region of interest in an image (e.g., an image region in a medical image representing a particular organ and/or tissue), and the region of interest and other regions not belonging to the region of interest may have different pixel values (e.g., 0 and 1). A segmentation mask is a mask used for image segmentation. In some embodiments, the segmentation mask may be acquired based on images of a plurality of specific organs and/or tissues and related information thereof.

In some embodiments, a plurality of medical images of identical or similar organs/tissues may be acquired in one or more ways. In some embodiments, the template and the segmentation mask may be acquired based on at least part of these images. For more information on how to obtain the template and the segmentation mask, a reference may be made to related description in FIGS. 4 and 5, which are not described repeatedly herein.

After obtaining the image information, a segmentation result of the image to be segmented may be obtained based on the image information. The segmentation result may be a medical image, in which regions are segmented to make each of the organs and/or tissues to be separated from each other. In some embodiments, the image segmentation module 220 may obtain the segmentation result of the image to be segmented based on the image information by using the image segmentation model. The image segmentation model may include an image transforming network and a segmenting network. In some embodiments, this procedure may include step 320 and step 330.

The image segmentation model is a model for segmenting or partitioning the organs and/or tissues in the medical image to make them to be separated from each other. In some embodiments, the image segmentation model may be a machine learning model, e.g., a neural network model, such as a Convolutional Neural Networks (CNN) model, etc.

In some embodiments, the image segmentation model may consist of a cascade of an image transforming network and a segmenting network, and the image to be segmented may be first inputted to the image transforming network to obtain a transformed image, and then the transformed image outputted from the image transforming network is used as an input of the segmenting network to obtain the segmentation result.

In step 320, a transformed image is obtained based on the image to be segmented and the template by the image transforming network. In some embodiments, the step 320 may be performed by the transformation unit 221.

The transformed image refers to an image obtained by performing a series of coordinate transformations on the medical image of organs and/or tissues, and the coordinate transformations may include rotation, and translation, etc. In some embodiments, the transformed image corresponding to the medical image may be obtained based on the medical image and a corresponding template image thereof.

In some embodiments, the image to be segmented and the corresponding template thereof are inputted to the image transforming network to obtain an outputted transformed image corresponding to the image to be segmented. The transformed image may be an image obtained after registering the image to be segmented with the template.

In some embodiments, the image segmentation model may process medical images of organs and/or tissues having symmetry. In some embodiments, the image to be segmented may contain of symmetry information, i.e., symmetric structure information of the organs and/or tissues having symmetry. In some embodiments, the image segmentation model may be configured to obtain the segmentation result based on the symmetry information.

In some embodiments, the image to be segmented may be a medical image of organs and/or tissues having the symmetry. In some embodiments, a location of a lesion may be observed by contrasting the symmetrical sides. However, the scanned images of the organs and/or tissues may be asymmetric due to uncontrollable conditions of the patient during a scan, therefore it is not convenient for the physician to observe. In some embodiments, a rigid transformation, namely a series of coordinate transformations (such as rotation and translation, etc.), may be performed on the image information to map the image information to the standard space, i.e., a coordinate space corresponding to the template, so that, on the one hand, it is convenient for the physician to observe, and on the other hand, the difficulty and cost of subsequent image processing are reduced. For more information on how to obtain the segmentation result based on the symmetry information, a reference may be made to related description in FIGS. 6 and 7, which are not be described repeatedly herein.

In some embodiments, the image transforming network may be a machine learning model, e.g., a neural network model such as a CNN model. In some embodiments, the image transforming network may be trained by the sample image information. For more information on how to train the image transforming network, a reference may be made to the related description in FIGS. 6 and 7, which are not be described repeatedly herein.

In step 330, the segmentation result is obtained based on the transformed image and the segmentation mask by the segmenting network. In some embodiments, the step 330 may be performed by the segmentation unit 222. In some embodiments, the transformed image and the segmentation mask corresponding to the image to be segmented may be inputted to the segmenting network, to obtain an outputted segmentation result. The segmentation result may be a transformed mask corresponding to the transformed image. In some embodiments, only the transformed image corresponding to the image to be segmented is inputted to the segmenting network to obtain an outputted transformation field (or namely a registered transformation field), and then the transformation field is applied to the segmentation mask to obtain a transformed mask (i.e., the segmentation result). The transformed mask may be a mask image (e.g., a binary image) having segmented regions and corresponding to the transformed image. In some embodiments, the segmentation result may also be obtained based on the transformed image, the template and the segmentation mask of the template by the segmenting network.

In some embodiments, the segmenting network may use a strategy of fusing transformation fields of multiple resolutions, that is, a fused transformation field is obtained by fusing transformation fields of different resolutions. For more information on the fusion of the transformation fields of multiple resolutions, a reference may be made to related description in FIGS. 8 and 9, which are not be described repeatedly herein.

In some embodiments, the transformation field may be first obtained based on the transformed image by the segmenting network, and then the segmentation result is obtained based on the transformation field and the segmentation mask by the segmenting network. For more information on how to obtain the segmentation result by the segmenting network, a reference may be made to related description in FIGS. 8 and 9, which are not be described repeatedly herein.

In some embodiments, the segmenting network may be a machine learning model, e.g., a neural network model such as a CNN model. In some embodiments, the segmenting network may be trained by a transformed sample image and a sample template, which correspond to the sample image information. For more information on how to train the segmenting network, a reference may be made to the related description in FIGS. 8 and 9, which are not be described repeatedly herein.

In some embodiments, during a training of the image segmentation model, the image transforming network and the segmenting network may be trained independently, or a joint training may be further performed on the basis of independent trainings to realize a micro-adjustment. For example, the image transforming network may be trained independently based on the method shown in FIGS. 6 and 7 to obtain a trained image transforming network, and the segmenting network may be trained independently based on the method shown in FIGS. 8 and 9 to obtain the trained segmenting network. Additionally, the joint training may be performed on the independently trained image transforming network and the independently trained segmenting network to realize the micro-adjustment. In some embodiments, if it is desired to show the segmentation result on the original image to be segmented, a rigid inverse transformation may be performed on the segmentation result corresponding to the transformed image (i.e., the transformed mask) to obtain the segmentation result of the original image to be segmented.

In some embodiments, the image segmentation model may be tested through following steps. Taken a brain image as an example, the image to be segmented together with the template image may be inputted to the image transforming network to obtain rotation and translation quantities, and then a rigid transformation is performed to obtain a transformed image. The transformed image separately or the transformed image together with the template is inputted to the segmenting network to obtain a registered transformation field. The segmentation mask of the template is processed by using the registered transformation field to obtain the partition result (segmentation result) of the transformed image. In some embodiments, the partition result may be used as a correlated input of an automatic scoring. In some embodiments, the image to be segmented may be preprocessed and then inputted to the image transforming network, for example, a result image, obtained by extracting brain parenchymal from the brain image to be segmented, is inputted to the image transforming network.

In some embodiments of the present disclosure, the medical image is processed by a cascaded neural network model based on deep learning to obtain tissue partitions and a segmentation result having symmetry, without pre-labelling data for the image, thus enhancing adaptability to multiple images, saving plenty of time and a lot of resources, and optimizing a processing procedure. In a cascading manner, independent training and learning may be performed in each stage during the processing, thus reducing the difficulty in training the model. A strategy of fusing multi resolutions is used during the segmentation, thereby enhancing adaptability to targets of different sizes, improving processing quality, and improving segmentation robustness. A multiple-resolution cascaded registration mode is more efficient than a conventional registration mode. The symmetry information is used during the processing, thus improving the accuracy and robustness of partitions on a critical side of the lesion. The correlation between images to be segmented is adopted, and the deep learning and the registration method are effectively combined, thereby enabling accurate segmentation of region, such as the region with inconspicuous structural tissue or the region of the artificially defined partition. By combining the above manners, various types of images to be segmented may be efficiently processed, and a more accurate segmentation result may be obtained, thereby providing a strong support for the diagnosis and treatment of the patient.

Figure 4:
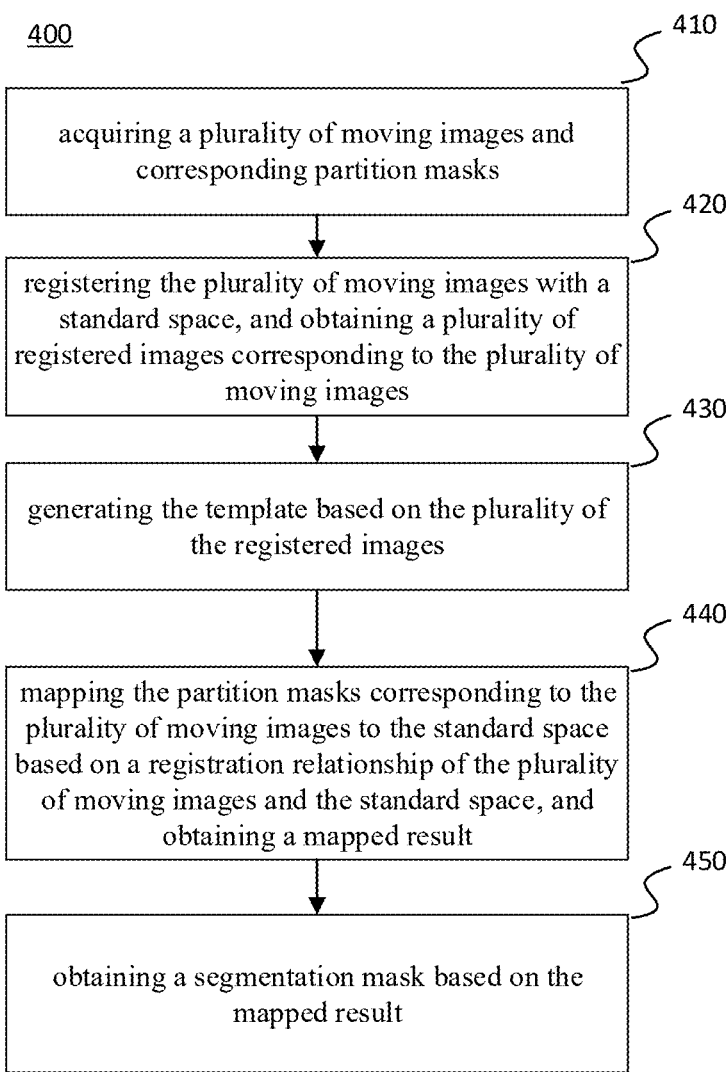
FIG. 4 is an exemplary flow chart of a method for generating a template and a segmentation mask according to some embodiments of the present disclosure.

FIG. 4 is an exemplary flow chart of a method for generating a template and a segmentation mask according to some embodiments of the present disclosure.

As shown in FIG. 4, the procedure 400 includes the following steps. In some embodiments, the procedure 400 may be performed by the template and mask acquisition module 230.

In step 410, a plurality of moving images and corresponding partition masks are acquired.

The moving images refers to a plurality of medical images corresponding to an image to be segmented. These moving images and the image to be segmented may be images of the same or similar organs and/or tissues. For example, the image to be segmented may be a head image of a patient, and the moving images may be a large number of head images of normal persons.

In some embodiments, the plurality of moving images and corresponding partition masks may be acquired in a number of ways (i.e., the organs and/or tissues in these moving images are partitioned to acquire partitioned images).

Figure 5:
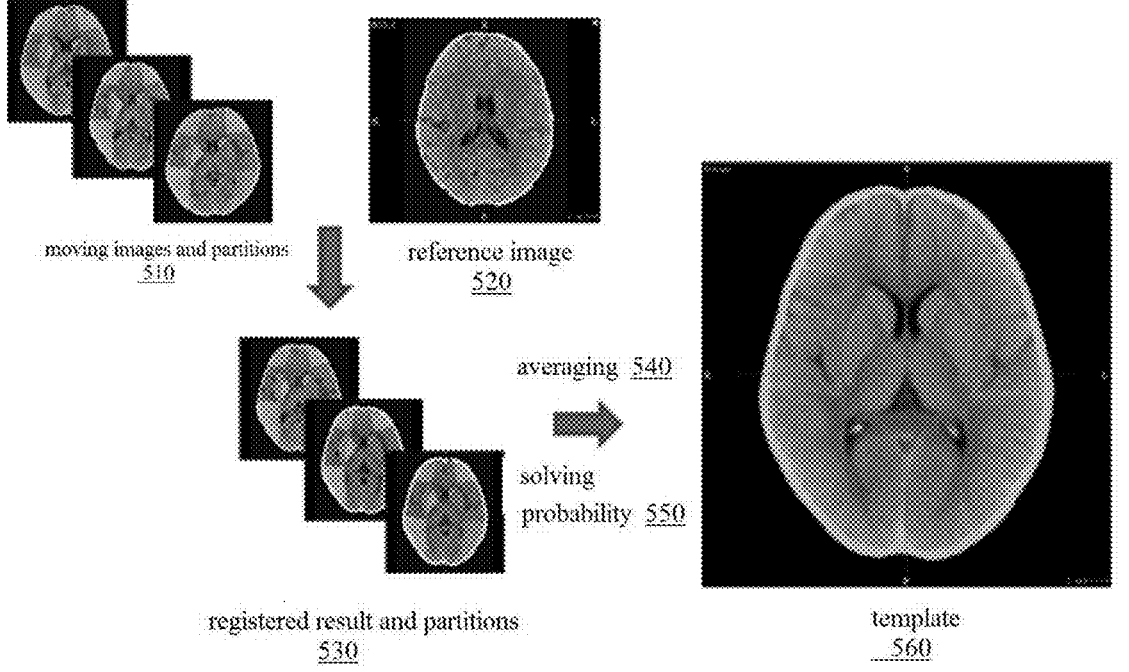
FIG. 5 is a schematic view showing the method for generating the template and the segmentation mask according to some embodiments of the present disclosure.

FIG. 5 is a schematic view showing the method for generating the template and the segmentation mask according to some embodiments of the present disclosure. As shown in FIG. 5, the template and the segmentation mask are acquired by CT scanning ASPECTS partitions. As shown in FIG. 5, in some embodiments, a large number of normal head images may be first acquired to serve as the moving images, and organs and/or tissues partitions, i.e., ASPECTS partition masks, are manually or automatically outlined in the moving images. In some embodiments, in order to reduce interferences in a subsequent registration procedure by a scan range, a skull, a background, etc., the parenchymal portion in the head image may be extracted, and the skull and portions other than the skull may be set as background values to obtain the moving images.

In step 420, the plurality of moving images are registered with the standard space, to obtain a plurality of registered images corresponding to the plurality of moving images.

The standard space may refer to a reference image as a standard for organs and/or tissues, and the standard space is the same as or similar to the organ and/or tissue in the moving images and in the mages to be segmented. For example, the standard space may be a standard reference image for the head. The standard space may be obtained based on statistical data and/or historical data, or may be predetermined.

The registration is aligning centers of organ and/or tissue structures in the images of a plurality of identical or similar organs and/or tissues with each other. In some embodiments, in order to preserve the specificity of each sample in a probability map, edges of the organ and/or tissue structures may not necessarily be overlapped during the registration. In some embodiments, a plurality of moving images may be registered with the standard space by a plurality of registration modes (such as a rigid registration mode, a registration mode with less deformation, etc.) to obtain a plurality of registered images corresponding to the plurality of moving images.

As shown in FIG. 5, in some embodiments, for the moving images and partitions 510, the rigid registration mode may be first used so that the moving images and the centers of the parenchymal portions in the reference image 520 are roughly aligned with each other, and then the registration mode with less deformation may be used so that the moving images and the centers of internal tissue structures in the reference image 520 are aligned with each other, to obtain the registered results and partitions 530.

In step 430, a template is generated based on the plurality of the registered images. In some embodiments, after the registered images are acquired, the template may be generated based on the plurality of registered images, e.g., averaging, sampling, extracting common features, etc., are performed on the plurality of registered images. As shown in FIG. 5, in some embodiments, the registered result and partitions 530, i.e., the images (i.e., registered images) obtained after the moving images are registered with the standard space, may be averaged through step 540 to obtain a brain parenchyma template 560.

In step 440, the partition masks corresponding to the plurality of moving images are mapped to the standard space based on a registration relationship of the plurality of moving images and the standard space, to obtain a mapped result.

In some embodiments, the partition masks corresponding to the plurality of moving images may be mapped to the standard space, respectively, according to a registration transformation relationship of the plurality of moving images and the standard space, so as to obtain the mapped result, that is, mapped organ and/or tissue partition images.

At step 450, a segmentation mask is obtained based on the mapped result. In some embodiments, the segmentation mask may be obtained by obtaining voxel probabilities from the mapped result. A voxel may correspond to a pixel of the medical image.

As shown in FIG. 5, in some embodiments, an operation 550 of solving probabilities may be performed on the registered result and the partitions 530 according to the registration transformation relationship and/or a transformation field, to obtain voxel probabilities, that is, the ASPECTS partition masks outlined manually or automatically are respectively mapped to the standard space to obtain the segmentation mask. For each mask region in the partition mask, a corresponding mapped partition is included in the mapped result. For a voxel, probabilities in the mask partitions are calculated, respectively, and the partition with the maximum probability is the mask partition in which the voxel is located, and the voxel is distributed to the mask partition. The segmentation mask is obtained based on the distribution result of all voxels. For example, for a voxel, the probabilities of the voxel corresponding to the partitions are $a_1, a_2, \ldots a_n$ in sequence, where n denotes the number of the partitions. If the maximum probability is $a_m$ ($1 \leq m \leq Sn$), the voxel is distributed to an m-th partition, and all the voxels are distributed according to the same manner, and the segmentation mask is obtained.

FIG. 6 is an exemplary flow chart of a method for training an image segmentation model according to some embodiments of the present disclosure.

As shown in FIG. 6, a procedure 600 includes the following steps. In some embodiments, the procedure 600 may be performed by the second calculating device 130.

In step 610, a sample image and a sample template are inputted to the image transforming network to obtain an affine transformation field and a rigid transformation field. In some embodiments, a plurality of sample images may be acquired from the scanned images of an imaging device and/or a plurality of sample images may be acquired from a storage device, and corresponding sample templates are acquired according to the sample images (for example, the sample templates corresponding to the sample images are acquired according to the method shown in FIG. 4). The sample images and corresponding sample templates are inputted to the image transforming network to obtain the affine transformation fields and the rigid transformation fields. A transformation field refers to an image obtained by performing different deformation operations on the original image, and these deformation operations may include rotation, translation, and scaling, etc. The affine transformation field refers to a transformation field obtained by rotation, translation, scaling operations, and the rigid transformation field refers to a transformation field obtained by rotation and translation operations. For more contents on how to obtain corresponding sample templates according to the plurality of sample images, a reference may be made to related description in FIGS. 4 and 5, which are not be described repeatedly herein.

Figure 7:
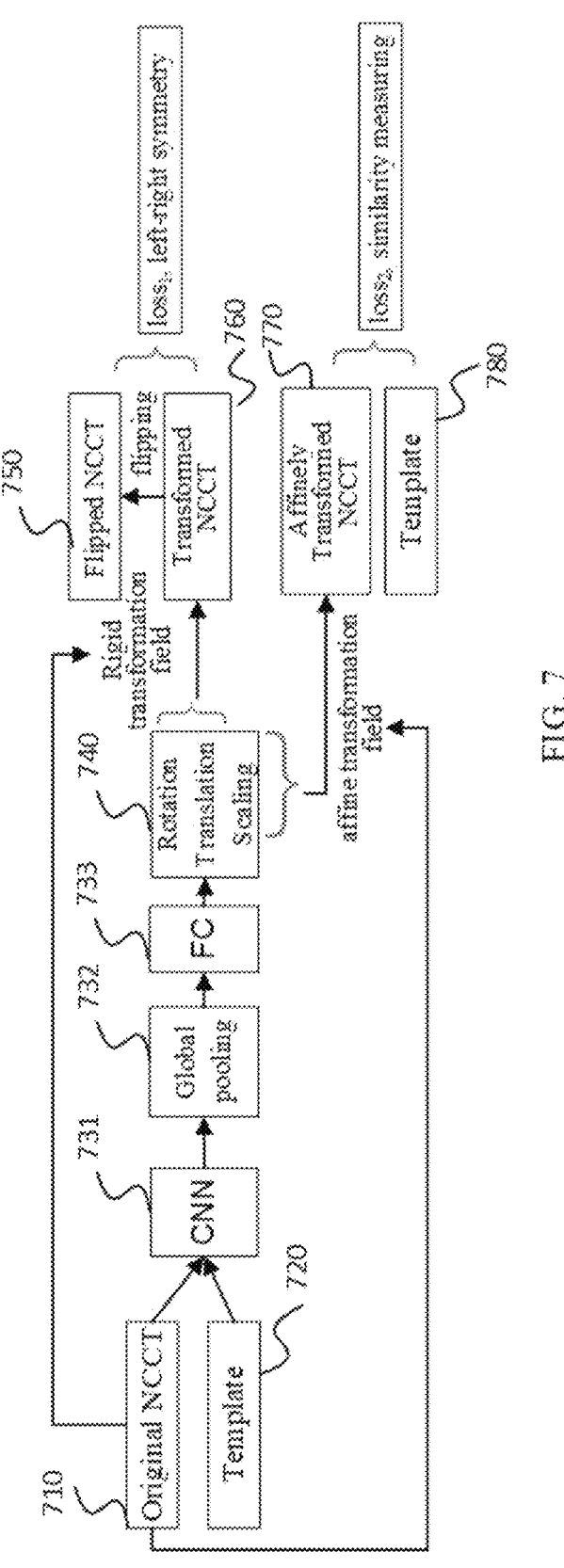
FIG. 7 is a schematic view showing a training of an image transforming network according to some embodiments of the present disclosure.

FIG. 7 is a schematic view showing a training of an image transforming network according to some embodiments of the present disclosure. As shown in FIG. 7, in some embodiments, the sample image, i.e., an original non-contrast CT (NCCT, scan CT) image 710, and the sample template, i.e., a template image 720, may be inputted to a CNN module 731 to obtain a depth feature. Then the depth feature may be processed by step 732 of global pooling, the full connection (FC) network 733, and step 740 of rotation, translation, and scaling operations, to output a transformed quantity. α denotes a rotation variable set, β denotes a translation variable set, and γ denotes a scaling variable set, and then the rotation variable set α, the translation variable set β, and the scaling variable set γ compose the affine transformation field A(α,β,γ), and the rotation variable set α and the translation variable set β compose the rigid transformation field R(α,β).

In step 620, an affinely transformed image is obtained based on the affine transformation field and the sample image. In some embodiments, the affine transformation field may be applied to the sample image, to obtain the affinely transformed image.

As shown in FIG. 7, in some embodiments, the affine transformation field A obtained in step 610 may be applied to the original NCCT image 710 to obtain an affinely transformed NCCT image 770.

In step 630, a transformed image is obtained based on the rigid transformation field and the sample image. In some embodiments, the rigid transformation field may be applied to the sample image to obtain the transformed image. In some embodiments, when the image segmentation is performed by using the image segmentation model, the transformed image may be taken as the output of the image transforming network and then inputted to the segmenting network to obtain a segmentation result.

As shown in FIG. 7, in some embodiments, the rigid transformation field R obtained in step 610 may be applied to the original NCCT image 710 to obtain a transformed NCCT image 760.

In step 640, a first loss function is obtained based on the transformed image. In some embodiments, a flip image may be obtained based on the transformed image, and the first loss function may be obtained according to the transformed image and the corresponding flip image. The first loss function may be configured to characterize the symmetry.

As shown in FIG. 7, in some embodiments, the transformed NCCT image 760 may be mirrored and flipped to obtain the flipped NCCT image 750. A similarity loss function loss/(e.g., an average error, and mutual information, etc.) is calculated according to the transformed NCCT image 760 and the flipped NCCT image 750, and the similarity loss function may be used as the first loss function.

In step 650, a second loss function is obtained based on the sample template and the affinely transformed image. In some embodiments, the second loss function may be obtained according to the sample template and the affinely transformed image, and may be used for measuring the similarity between images.

As shown in FIG. 7, in some embodiments, a similarity loss function $loss_2$ (e.g., the mutual information, etc.) may be calculated according to the affinely transformed NCCT images 770 and the template 780 (such as the template 720). The similarity loss function may be associated with the image registration, and may be used as the second loss function.

In step 660, parameters of the image transforming network are updated based on the first loss function and the second loss function. In some embodiments, a total loss function of the image transforming network may be calculated according to the first loss function and the second loss function, and the image transforming network is trained and updated by using the total loss function.

In some embodiments, loss denotes the total loss function of the image transforming network, $loss_1$ denotes the first loss function, $\lambda_1$ denotes a weight of the first loss function, and $loss_2$ denotes the second loss function, then the total loss function of the image transforming network may be calculated according to the following equation (1):

$$loss=\lambda_1 loss_1+loss_2 \tag{1}$$

In some embodiments of the present disclosure, the transformed image is obtained based on the symmetry. For tissues or organs having the symmetry, a location of a lesion may be observed more easily by contrasting the symmetrical sides, which solves the problem of asymmetric tomographic images caused by uncontrollable conditions of a patient during a scan, and the transformed image makes it convenient for a doctor to observe. Moreover, the learning cost of the model for data of different orientations is reduced.

Figure 8:
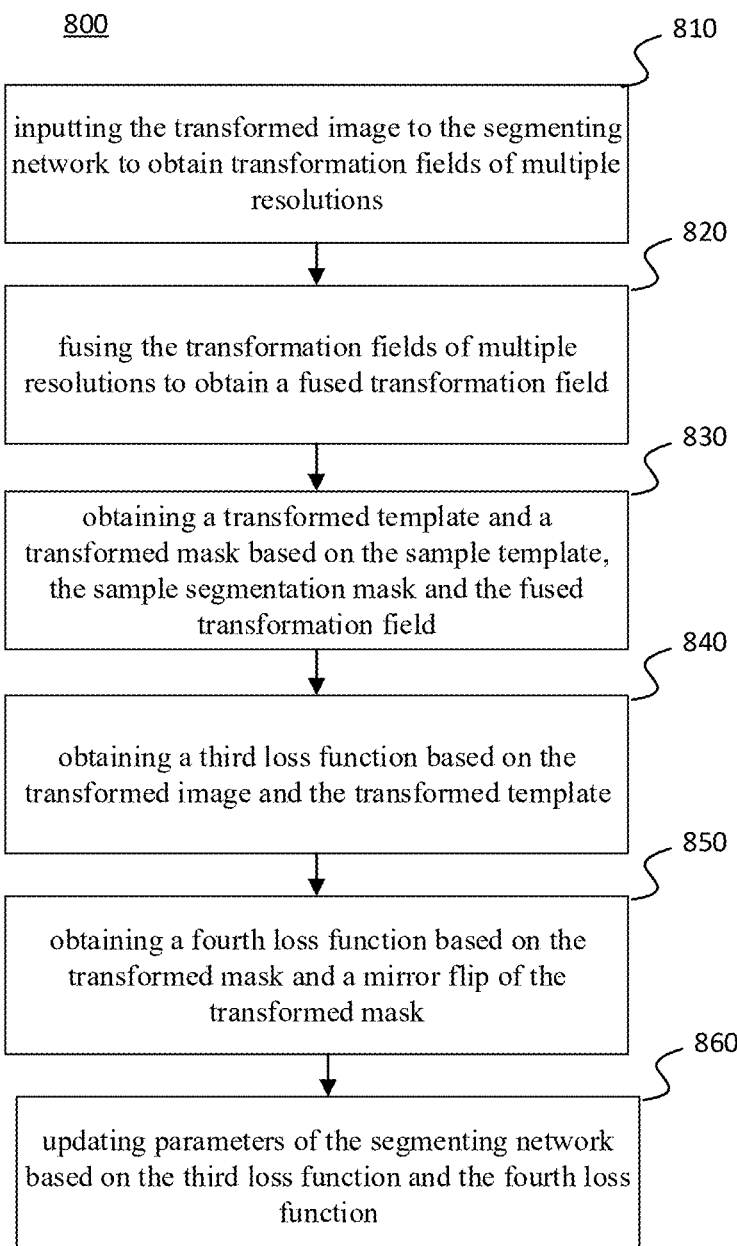
FIG. 8 is an exemplary flow chart of a method for training the image segmentation model according to some embodiments of the present disclosure.

FIG. 8 is an exemplary flow chart of a method for training the image segmentation model according to some embodiments of the present disclosure.

As shown in FIG. 8, a procedure 800 includes the following steps. In some embodiments, the procedure 800 may be performed by the second calculating device 130.

In step 810, the transformed image is inputted to the segmenting network to obtain transformation fields of multiple resolutions. In some embodiments, the transformed image obtained in step 630 may be inputted to the segmenting network, to obtain the transformation fields of multiple resolutions. A downsampling may be performed on the inputted transformed image to obtain the transformed images of different resolutions. Alternatively, the downsampling may be performed on the transformed image to obtain transformed images of different resolutions, and then the transformed images of different resolutions are inputted to the segmenting network. The transformation fields of multiple resolutions may be obtained corresponding to the transformed images of multiple resolutions. In some embodiments, the sample template and the transformed image obtained in step 630 may be inputted to the segmenting network, to obtain the transformation fields of multiple resolutions.

Figure 9:
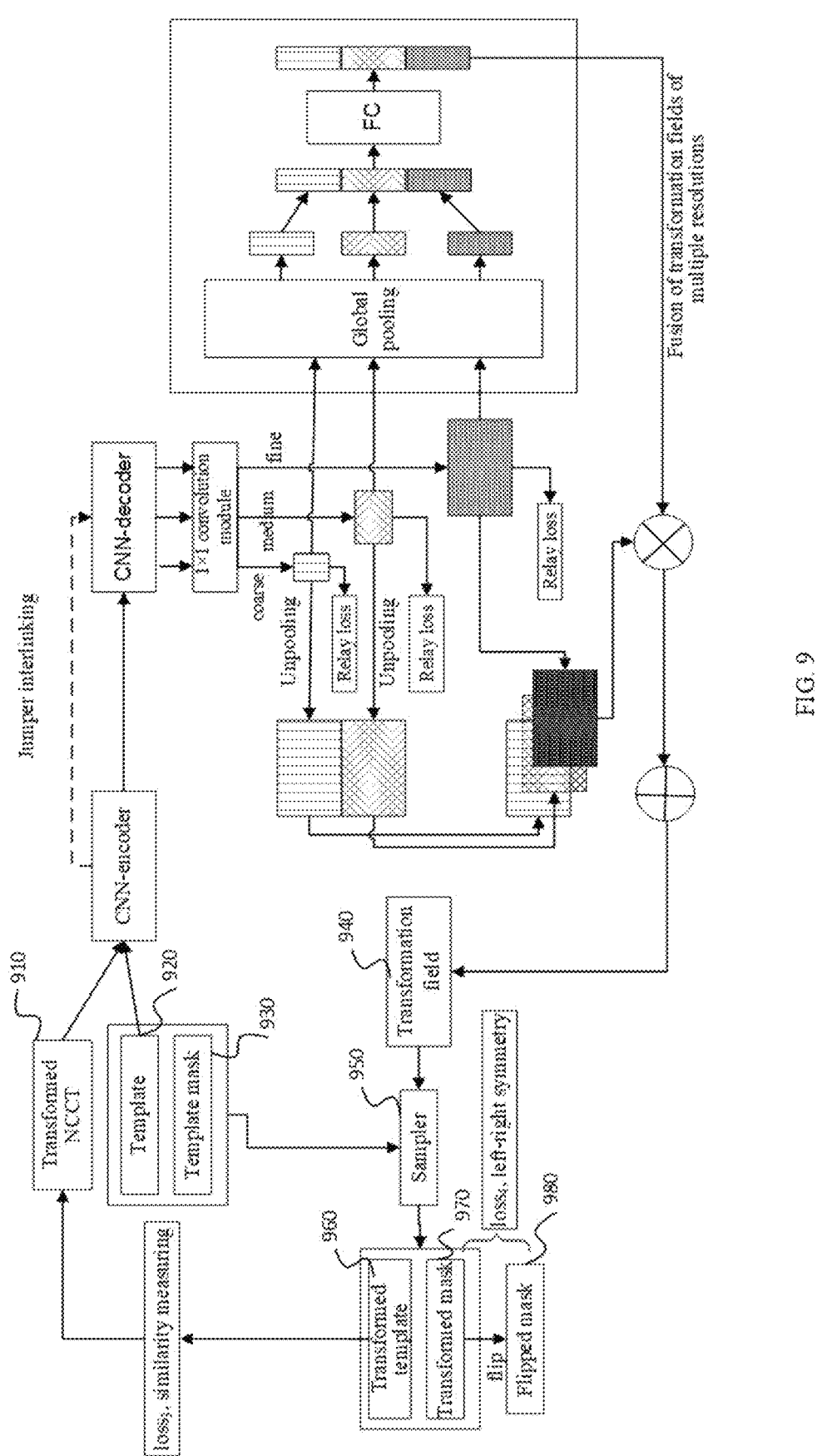
FIG. 9 is a schematic view showing a training of a segmenting network according to some embodiments of the present disclosure.

FIG. 9 is a schematic view showing a training of a segmenting network according to some embodiments of the present disclosure. As shown in FIG. 9, in some embodiments, the transformed NCCT image 910 and the template 920 acquired in step 630 may be inputted to a CNN encoder and a CNN decoder to be encoded and decoded. The CNN encoder may encode the original image to obtain abstract features, and the CNN decoder may decode the abstract features into a corresponding transformation field image. In some embodiments, the CNN encoder and the CNN decoder (such as a Vnet, and a Unet, etc.) may be configured for a structural transformation, where a major deformation may be an upsampling at the stage of decoding.

As shown in FIG. 9, in some embodiments, at a decoding stage of the CNN decoder, the upsampling may be phased. Sizes of features of the different stages reflect different resolutions of the inputted images, i.e., the arrangement of grid points of different resolutions of the registration, and the corresponding transformation fields of multiple resolutions are obtained by a structural transformation based on the images of different resolutions. For the corresponding description on how to obtain the transformation field based on the image, a reference may be made to the step 610, which is not described herein repeatedly. In some embodiments, according to image resolutions, different stages may be divided into three stages: coarse, medium and fine stages, to obtain three transformation fields: coarse, medium and fine transformation fields corresponding to different resolutions. The numbers of controlled grid points of different stages may be different and may be adjusted according to actual problems.

In step 820, transformation fields of multiple resolutions are fused to obtain a fused transformation field. In some embodiments, multiple transformation fields of different resolutions may be fused to obtain the fused transformation field.

As shown in FIG. 9, in some embodiments, during a fusion of the transformation fields of multiple resolutions, firstly, the upsampling features of the different stages, that is, the coarse, the medium, and the fine transformation fields corresponding to different resolutions, may be changed into $$N \times 3 \times \frac{Z}{t} \times \frac{H}{t} \times \frac{W}{t}$$

by changing channels through a 1×1 convolution module, where t denotes a multiple of the downsampling, i.e., a sampling rate (resolution), N denotes the number of sample images, Z, H, and W indicate sizes of the original unit image, and 3 indicates that the transformation field has three channels x, y, and z, that is, the pixels of the transformation field are three-dimensional. In addition, $P_t$ denotes the number of grid points of different resolutions. Then, on the one hand, an unpooling operation is performed on the coarse transformation field and the medium transformation field to change them into the transformation fields with the same size as the fine transformation field, so as to perform a stitching operation. On the other hand, the coarse transformation field, the medium transformation field and the fine transformation field each are processed by a global pooling, and stitched and inputted to the Full Connection (FC) network module to obtain fusion weights of the transformation fields, namely, the weight coefficient of each transformation field. Finally, a multiplication operation is performed on a stitched transformation field and a weight coefficient thereof, and an addition operation is performed on the channels in which the coarse, medium, and fine transformation fields are located, to obtain $$N \times 3 \times \frac{Z}{t_3} \times \frac{H}{t_3} \times \frac{W}{t_3},$$

where $t_3$ denotes a downsampling multiple of the fine stage, thereby obtaining the transformation field 940, namely, the fused transformation field.

Whether the template 920 and the template mask 930 are inputted to the CNN may affect the number of channels above, such as the three channels of the coarse, medium, and fine transformation fields above. In some embodiments, the template 920 and the template mask 930 may not be inputted to the CNN.

In step 830, a transformed template and a transformed mask are obtained based on the sample template, the sample segmentation mask and the fused transformation field. In some embodiments, the sample template, the sample segmentation mask, and the fused transformation field may be sampled to obtain the transformed template and the transformed mask.

As shown in FIG. 9, in some embodiments, the template 920, the template mask 930 (i.e., the sample segmentation mask), together with the transformation field 940 obtained in step 820, may be inputted to a sampler 950 to obtain the transformed template 960 and the transformed mask 970.

In some embodiments, the transformed image and the transformed template may be inputted to the segmenting network, and the transformed image may be kept unchanged, to obtain the transformed mask to serve as the segmentation result of the transformed image.

In step 840, a third loss function is obtained based on the transformed image and the transformed template. In some embodiments, the third loss function may be obtained according to the transformed image and the transformed template, and the third loss function may be configured to measure the similarity related to the registration.

As shown in FIG. 9, in some embodiments, the similarity loss function $loss_3$ (e.g., the mutual information, etc.) may be calculated according to the transformed NCCT image 910 and the transformed template 960, and this similarity loss function is associated with the image registration, and may serve as the third loss function.

In step 850, a fourth loss function is obtained based on the transformed mask and a mirror flip of the transformed mask. In some embodiments, the mirror flip of the transformed mask may be obtained based on the transformed mask, and the fourth loss function may be obtained according to the transformed mask and the mirror flip of the transformed mask. The fourth loss function may be configured to characterize the symmetry.

As shown in FIG. 9, in some embodiments, the transformed mask 970 may be mirrored and flipped to obtain the flipped mask 980. A similarity loss function $loss_4$ (e.g., an average error, and mutual information, etc.) is calculated according to the transformed mask 970 and the flipped mask 980, and the similarity loss function may serve as the fourth loss function.

In step 860, parameters of the segmenting network are updated based on the third loss function and the fourth loss function. In some embodiments, a total loss function of the segmenting network may be calculated according to the third loss function and the fourth loss function, and the segmenting network is trained and updated by using the total loss function.

In some embodiments, during the upsampling, a relay supervision may be performed on the transformation field corresponding to each resolution, and a corresponding loss functions, i.e., a relay loss function, denoted as $loss_n$, may be obtained by the method including step 840 and/or step 850. The process of obtaining the relay loss function may be equivalent to a procedure including applying an intermediate transformation field to the sample template and the sample segmentation mask, and sampling to obtain a result similar to the transformed mask, and calculating a loss function by the method including the step 840 and/or the step 850.

In some embodiments, a regular smoothing operation may be performed on all transformation fields, and this operation may be denoted as $$R(P) = \sum_{i=1}^{n} \|\nabla P(i)\|,$$

17 where P represents the transformation field, R (P) represents a smoothed transformation field, and n represents the number of the transformation fields.

In some embodiments, after obtaining the smoothed transformation field R(P), the total loss function of segmenting network may be calculated according to the following equation (2):

$$\text{loss} = \sum_5^n \lambda_n \text{loss}_n + \lambda_2 \text{loss}_4 + \text{loss}_3 + \sum \tau_i R(P_i) \quad (2)$$

where, loss denotes the total loss function of the segmenting network, $\text{loss}_3$ denotes the third loss function, $\text{loss}_4$ denotes the fourth loss function, $\lambda_2$ denotes a weight of the fourth loss function, $\text{loss}_n$ denotes the relay loss function, and $\lambda_n$ denotes a weight of the relay loss function.

In some embodiments of the present disclosure, fitting transformation field by the neural network model is modified and restricted, and multiple-resolution features are combined, thereby enhancing the adaptability to the tissues or organs having the symmetry, and to data of the critical lesion.

It should be noted that the description of procedures 300, 400, 600, and 800 is for the purposes of illustration and description, but not intended to limit the applicable scope of the present disclosure. For those skilled in the art, various modifications and changes may be made for the procedures 300, 400, 600, and 800 under the guidance of the present disclosure. However, these modifications and variations are still within the scope of the present disclosure. For example, the orders of the step 640 and the step 650 may be exchanged.

The present disclosure further provides a device of image segmentation. The device of image segmentation includes a processor and a memory, and a computer program is stored in the memory. When executing the computer program, the processor performs any method of the embodiments above.

The present disclosure further provides a non-transitory computer-readable storage medium. Computer instructions are stored in the storage medium, and when reading the computer instructions in the storage medium, the computer performs any method of the embodiments above.

The basic concepts have been described above. It is obvious for those skilled in the art that the above detailed disclosure is just exemplary, but not intended to constitute a limitation on the present disclosure. Although not explicitly described herein, various modifications, improvements, and amendments may be made for the present disclosure by those skilled in the art. These modifications, improvements, and amendments are advised in the present disclosure, so these modifications, improvements, and amendments still fall within the spirits and the scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic in connection with at least one embodiment in the specification. Therefore, it should be emphasized and appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it should be understood that such detail is solely for the purpose of illustration, and that the appended claims are not limited to the disclosed embodiments, but, on the contrary, are intended to cover modifications and equivalent arrangements that are within the spirit and scope of the disclosed embodiments. For example, although the implementation of various system components described above may be embodied in a hardware device, it may also be implemented as a software only solution, e.g., an installation of the system on an existing server or mobile device.

Similarly, it should be appreciated that in the description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter lie in less than all features of a single foregoing disclosed embodiment.

In some embodiments, numbers are used for describing the ingredients, attributes, and it should be understood that such numbers used in the description of the embodiments, in some embodiments, are modified by using the terms "about", "approximate", or "substantial". Unless otherwise specified, the terms "about", "approximate", or "substantial" indicates that the number is allowed to change within a range from −20% to +20%. Accordingly, in some embodiments, the numerical parameters used in the specification and claims are all approximations that may vary according to desired characteristics of an embodiment. In some embodiments, specified valid digits should be taken into account for the numerical parameters, and use a general digit retention method. Although the range of values and parameters configured to determine a range in some embodiments of the present disclosure are approximations, in particular embodiments, the set of such values is as accurate as possible within a feasible range.

Each of patents, patent applications, patent application publications, and other materials, such as articles, books, specifications, publications, and documents, etc., cited in the present disclosure are incorporated by reference in their entirety. Except for application history documents inconsistent or conflicting with the contents of the present disclosure, the documents (currently or later appended to the present disclosure) limiting the broadest scope of the claims and the specification are also excluded. It should be noted that, for the description, the definition, and/or use of the terms, which are used in the accessory material of the present specification and are inconsistent or conflict with those described in the present disclosure, they are subject to the description, the definition, and/or the terms used in the present disclosure.

Finally, it should be understood that the embodiments described in the present disclosure are merely for the purpose of illustrating the principles of the present disclosure embodiments. Other modifications may also fall within the range of the present disclosure. Thus, as examples rather than limitations, alternative configurations of the embodiments of the present specification may be considered to be consistent with what taught by the present specification. Accordingly, the embodiments of the present disclosure are not limited to the embodiments explicitly illustrated and described by the present disclosure.

What is claimed is:

1. A method of image segmentation, comprising:

acquiring image information, the image information comprising an image to be segmented, a template, and a segmentation mask of the template; and obtaining a segmentation result of the image to be segmented based on the image information by an image segmentation model, and the image segmentation model comprising an image transforming network and a segmenting network;

wherein acquiring the image information comprises:

acquiring a plurality of moving images and corresponding partition masks;

registering the plurality of moving images with a standard space, and obtaining a plurality of registered images corresponding to the plurality of moving images; and generating the template based on the plurality of the registered images.

2. The method of claim 1, wherein the obtaining the segmentation result of the image to be segmented based on the image information by the image segmentation model comprises:

obtaining a transformed image based on the image to be segmented and the template by the image transforming network; and obtaining the segmentation result based on the transformed image and the segmentation mask of the template by the segmenting network.

3. The method of claim 1, wherein the image to be segmented comprises symmetry information, and the image segmentation model is configured to obtain the segmentation result based on the symmetry information.

4. The method of claim 1, wherein the acquiring the image information further comprising:

mapping the partition masks corresponding to the plurality of moving images to the standard space based on a registration relationship of the plurality of moving images and the standard space, and obtaining a mapped result; and obtaining the segmentation mask of the template based on the mapped result.

5. The method of claim 1, wherein prior to the obtaining the segmentation result of the image to be segmented based on the image information by the image segmentation model, the method further comprises training the image segmentation model, and the training the image segmentation model comprises:

acquiring sample image information, the sample image information comprising a sample image, a sample template, and a sample segmentation mask; and training the image segmentation model based on the sample image information.

6. The method of claim 5, wherein the training the image segmentation model based on the sample image information comprises:

inputting a sample image and a sample template to the image transforming network to obtain an affine transformation field and a rigid transformation field;

obtaining an affinely transformed image based on the affine transformation field and the sample image;

obtaining a transformed image based on the rigid transformation field and the sample image;

obtaining a first loss function based on the transformed image;

obtaining a second loss function based on the sample template and the affinely transformed image; and updating parameters of the image transforming network based on the first loss function and the second loss function.

7. The method of claim 6, wherein the training the image segmentation model based on the sample image information further comprises:

inputting the transformed image to the segmenting network to obtain transformation fields of multiple resolutions;

fusing the transformation fields of multiple resolutions to obtain a fused transformation field;

obtaining a transformed template and a transformed mask based on the sample template, the sample segmentation mask and the fused transformation field;

obtaining a third loss function based on the transformed image and the transformed template;

obtaining a fourth loss function based on the transformed mask and a mirror flip of the transformed mask; and updating parameters of the segmenting network based on the third loss function and the fourth loss function.

8. The method of claim 6, wherein the training the image segmentation model based on the sample image information further comprises:

inputting the transformed image and the sample template to the segmenting network to obtain transformation fields of multiple resolutions;

fusing the transformation fields of multiple resolutions to obtain a fused transformation field;

obtaining a transformed template and a transformed mask based on the sample template, the sample segmentation mask and the fused transformation field;

obtaining a third loss function based on the transformed image and the transformed template;

obtaining a fourth loss function based on the transformed mask and a mirror flip of the transformed mask; and updating parameters of the segmenting network based on the third loss function and the fourth loss function.

9. The method of claim 7, wherein after the training the image segmentation model, the method further comprises testing the image segmentation model, and the testing the image segmentation model comprises:

inputting the image to be segmented together with the template to the image transforming network to obtain rotation and translation quantities, and performing a rigid transformation to obtain a transformed image;

inputting the transformed image separately to the segmenting network to obtain a registered transformation field;

processing the segmentation mask of the template by using the registered transformation field to obtain the segmentation result of the transformed image; and taking the segmentation result as an input of an automatic scoring.

10. The method of claim 8, wherein after the training the image segmentation model, the method further comprises testing the image segmentation model, and the testing the image segmentation model comprises:

inputting the image to be segmented together with the template to the image transforming network to obtain rotation and translation quantities, and performing a rigid transformation to obtain a transformed image;

inputting the transformed image and the template to the segmenting network to obtain a registered transformation field;

processing the segmentation mask of the template by using the registered transformation field to obtain the segmentation result of the transformed image; and taking the segmentation result as an input of an automatic scoring.

11. The method of claim 1, wherein the obtaining the segmentation result of the image to be segmented based on the image information by the image segmentation model comprises:

obtaining a transformed image based on the image to be segmented and the template by the image transforming network; and obtaining the segmentation result based on the transformed image, the template, and the segmentation mask of the template by the segmenting network.

12. A system of image segmentation, comprising:

an image information acquiring module, configured to acquire image information, the image information comprising an image to be segmented, a template, and a segmentation mask of the template; and an image segmentation module, configured to obtain a segmentation result of the image to be segmented based on the image information by an image segmentation model, and the image segmentation model comprising an image transforming network and a segmenting network; and a template and mask acquisition module, configured to: acquire a plurality of moving images and corresponding partition masks; register the plurality of moving images with a standard space, and obtain a plurality of registered images corresponding to the plurality of moving images; and generate the template based on the plurality of the registered images.

13. The system of image segmentation of claim 12, wherein the template and mask acquisition module is further configured to: map the partition masks corresponding to the plurality of moving images to the standard space based on a registration relationship of the plurality of moving images and the standard space, and obtain a mapped result; and obtain a segmentation mask based on the mapped result.

14. The system of image segmentation of claim 12, further comprising:

a training module, configured to: acquire sample image information, the sample image information comprising a sample image, a sample template, and a sample segmentation mask; and train the image segmentation model based on the sample image information.

15. The system of image segmentation of claim 14, wherein the training module training the image segmentation model comprises the training module training an image transforming network and the training module training a segmenting network; and the training module training the image transforming network comprises:

inputting a sample image and a sample template to the image transforming network to obtain an affine transformation field and a rigid transformation field;

obtaining an affinely transformed image based on the affine transformation field and the sample image;

obtaining a transformed image based on the rigid transformation field and the sample image;

obtaining a first loss function based on the transformed image;

obtaining a second loss function based on the sample template and the affinely transformed image; and updating parameters of the image transforming network based on the first loss function and the second loss function.

16. The system of image segmentation of claim 15, wherein the training module training the segmenting network comprises:

inputting the transformed image to the segmenting network to obtain transformation fields of multiple resolutions;

fusing the transformation fields of multiple resolutions to obtain a fused transformation field;

obtaining a transformed template and a transformed mask based on the sample template, the sample segmentation mask and the fused transformation field;

obtaining a third loss function based on the transformed image and the transformed template;

obtaining a fourth loss function based on the transformed mask and a mirror flip of the transformed mask; and updating parameters of the segmenting network based on the third loss function and the fourth loss function.

17. A device of image segmentation, comprising a processor and a memory, wherein a computer program is stored in the memory, and when executing the computer program, the processor performs the method of claim 1.

18. A non-transitory computer-readable storage medium, wherein, computer instructions are stored in the storage medium, and when reading the computer instructions in the storage medium, the computer performs the method of claim 1.

* * * * *